(12) United States Patent
Xie

(10) Patent No.: US 10,561,003 B2
(45) Date of Patent: Feb. 11, 2020

(54) ILLUMINATION METHOD, ILLUMINATION APPARATUS AND STORAGE MEDIUM

(71) Applicant: Beijing Xiaomi Mobile Software Co., Ltd., Haidian District, Beijing (CN)

(72) Inventor: Yan Xie, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 16/128,513

(22) Filed: Sep. 12, 2018

(65) Prior Publication Data
US 2019/0098733 A1    Mar. 28, 2019

(30) Foreign Application Priority Data

Sep. 25, 2017    (CN) .......................... 2017 1 0874760

(51) Int. Cl.
*H05B 37/02*    (2006.01)
*G01C 21/00*    (2006.01)
(Continued)

(52) U.S. Cl.
CPC ......... *H05B 37/0272* (2013.01); *G01C 21/20* (2013.01); *G01C 21/3626* (2013.01); *G01C 21/3688* (2013.01); *H05B 37/0281* (2013.01)

(58) Field of Classification Search
CPC ............... H05B 37/02; H05B 37/0272; H05B 37/0281; G01C 21/3688; G01C 21/00;
(Continued)

(56) References Cited

U.S. PATENT DOCUMENTS

2006/0089170 A1* 4/2006 Ashman, Jr. ......... H04B 1/3805
455/556.1
2013/0268162 A1* 10/2013 Ponziani ............... B60W 30/00
701/48
(Continued)

FOREIGN PATENT DOCUMENTS

CN    101598564 A    12/2009
CN    102998683 A    3/2013
(Continued)

OTHER PUBLICATIONS

First Office Action issued in corresponding Chinese Application No. 201710874760.9, dated Jan. 9, 2019.
(Continued)

*Primary Examiner* — Thai Pham
(74) *Attorney, Agent, or Firm* — Jun He Law Offices P.C.; James J. Zhu

(57) ABSTRACT

The present disclosure relates to an illumination method, an illumination apparatus and a storage medium for an intelligent flashlight, and an intelligent device. The illumination method for an intelligent flashlight includes: acquiring a current operation mode of the intelligent flashlight, and when the intelligent flashlight is in a setting mode, acquiring reference route information for current navigation from a terminal associated with the intelligent flashlight and in a navigation state; acquiring current route information of the intelligent flashlight, determining whether the current route information is consistent with the reference route information, and generating a route determination result; and determining an illumination mode of the intelligent flashlight according to the route determination result.

20 Claims, 10 Drawing Sheets

(51) Int. Cl.
*G01C 21/20* (2006.01)
*G01C 21/36* (2006.01)

(58) Field of Classification Search
CPC ... G01C 21/20; G01C 21/362; G01C 21/3626
See application file for complete search history.

(56) References Cited

U.S. PATENT DOCUMENTS

| | | |
|---|---|---|
| 2016/0088710 A1 | 3/2016 | Ren et al. |
| 2017/0191833 A1 | 7/2017 | Bouch et al. |
| 2018/0284392 A1* | 10/2018 | Stafford .................. G06F 3/017 |

FOREIGN PATENT DOCUMENTS

| | | |
|---|---|---|
| CN | 103874304 A | 6/2014 |
| CN | 204829307 U | 12/2015 |
| CN | 105423165 A | 3/2016 |
| CN | 105848383 A | 8/2016 |
| CN | 106713630 A | 5/2017 |
| WO | 2013189737 A1 | 12/2013 |

OTHER PUBLICATIONS

Extended European search report of European Patent Application No. 18196374.5, from the European Patent office, dated Feb. 7, 2019.
The Second Office Action in Chinese Application No. 201710874760.9, dated Jul. 26, 2019.

* cited by examiner

ILLUMINATION METHOD, ILLUMINATION APPARATUS AND STORAGE MEDIUM

CROSS-REFERENCE TO RELATED APPLICATION

This application is based upon and claims priority to Chinese patent application No. 201710874760.9 filed Sep. 25, 2017, which is incorporated herein by reference in its entirety.

TECHNICAL FIELD

The present disclosure relates to the field of communication technology, and more particularly, to an illumination method, an illumination apparatus and a storage medium for an intelligent flashlight, and an intelligent device.

BACKGROUND

When a user walks at night, especially when he walks on an unfamiliar road or walks in a wild field with few markers, it is easy to lose his direction, thereby causing potential dangers to the user's personal safety and also easily causing delay of the user's journey.

In the related art, when the user goes in a wrong direction, the user can rarely get relevant prompts. Although some intelligent devices can guide the user with a compass function, the user may not be able to concentrate on the traffic conditions due to frequent checking of the compass at night.

SUMMARY

In order to overcome the problem existing in the related art, embodiments of the present disclosure provide an illumination method, an illumination apparatus and a storage medium for an intelligent flashlight, and an intelligent device, to solve the defect in the related art that when the user gets lost, the user can rarely get relevant prompts.

According to a first aspect of the embodiments of the present disclosure, there is provided an illumination method for an intelligent flashlight. The method includes:

acquiring reference route information for current navigation from a terminal associated with the intelligent flashlight;

acquiring current route information of the intelligent flashlight;

determining whether the current route information is consistent with the reference route information, and generating a route determination result; and determining an illumination mode of the intelligent flashlight according to the route determination result.

According to a second aspect of the embodiments of the present disclosure, there is provided an intelligent device, including:

a processor; and a memory for storing instructions executable by the processor, wherein the processor is configured to:

acquire reference route information for current navigation from a terminal associated with the intelligent flashlight;

acquire current route information of the intelligent flashlight;

determine whether the current route information is consistent with the reference route information, and generate a route determination result; and determine an illumination mode of the intelligent flashlight according to the route determination result.

According to a third aspect of the embodiments of the present disclosure, there is provided a computer readable storage medium having stored thereon a computer program that, when being executed by a processor, performs steps of:

acquiring reference route information for current navigation from a terminal associated with the intelligent flashlight;

acquiring current route information of the intelligent flashlight;

determining whether the current route information is consistent with the reference route information, and generating a route determination result; and determining an illumination mode of the intelligent flashlight according to the route determination result.

It should be understood that both the foregoing general description and the following detailed description are exemplary and explanatory only and are not restrictive of the disclosure.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise specified. The implementations set forth in the following description of exemplary embodiments do not represent all implementations consistent with the disclosure. Instead, they are merely examples of apparatuses and methods consistent with aspects related to the disclosure as recited in the appended claims.

Figure 1A:
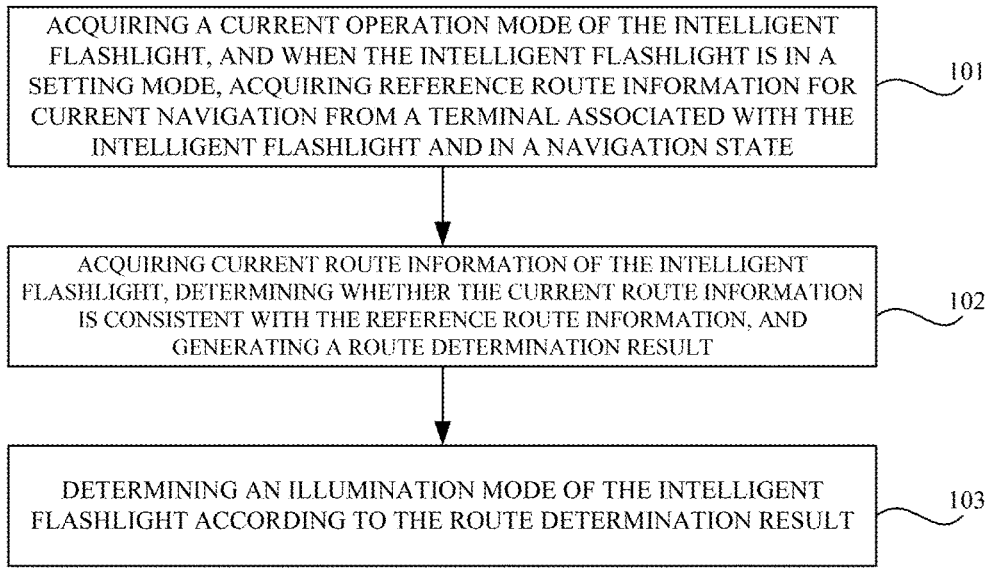
FIG. 1A is a flowchart illustrating an illumination method for an intelligent flashlight according to an exemplary embodiment.
Figure 1B:
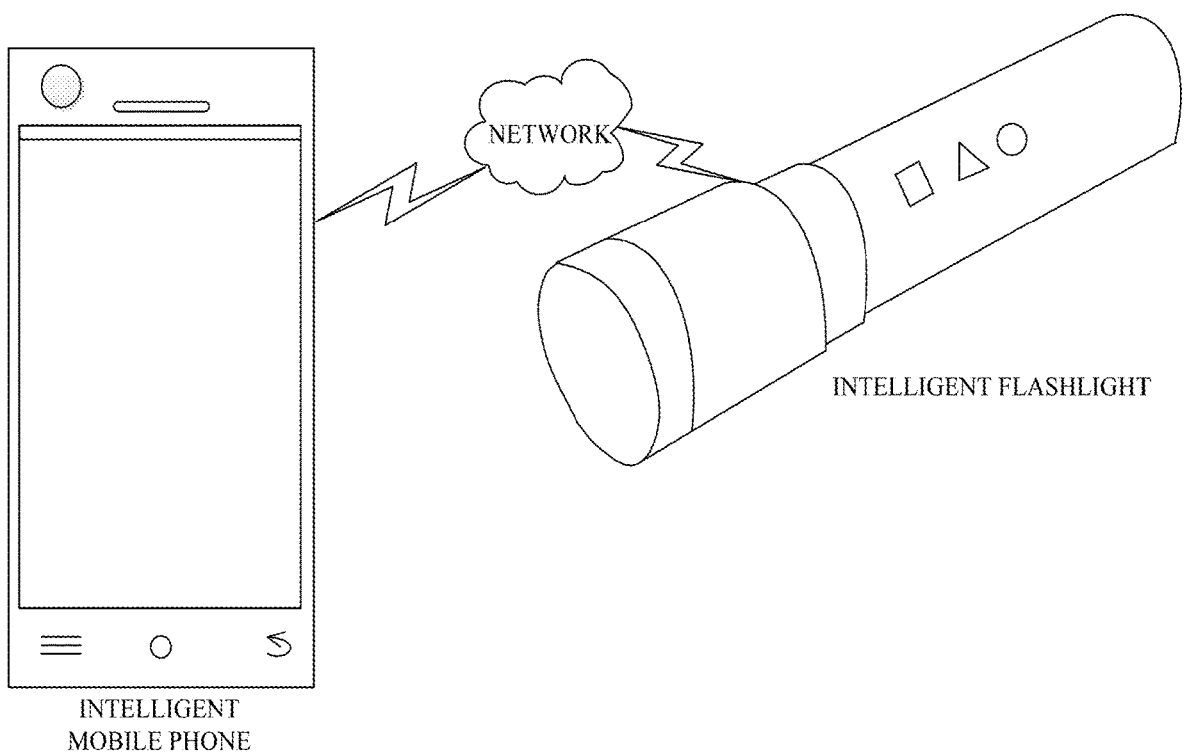
FIG. 1B is a schematic diagram of a scenario of an illumination method for an intelligent flashlight according to an exemplary embodiment.

FIG. 1A is a flowchart illustrating an illumination method for an intelligent flashlight according to an exemplary embodiment. FIG. 1B is a schematic diagram of a scenario of an illumination method for an intelligent flashlight according to an exemplary embodiment. The illumination method for an intelligent flashlight may be applied to an intelligent flashlight, and the intelligent flashlight is associated with an intelligent terminal.

The intelligent flashlight in the present disclosure combines dimming technology of traditional flashlight with IT technology, and is provided with a built-in open programmable intelligent control chip. Thus, the user may customize the flashlight with personalized illumination modes through dedicated software. The terminal in the present disclosure may be any intelligent terminal with Internet access function. For example, the terminal may be specifically a mobile phone, a tablet computer, a PDA (Personal Digital Assistant), or the like.

The terminal may access a router through a wireless local area network, and access a server on a public network through the router. As shown in FIG. 1A, the illumination method for an intelligent flashlight may include the following steps 101-103.

In step 101, a current operation mode of the intelligent flashlight is acquired. When the intelligent flashlight is in a setting mode, reference route information for current navigation is acquired from a terminal associated with the intelligent flashlight and in a navigation state.

In an embodiment, the operation mode of the intelligent flashlight may include an illumination method as in the related art, and may also include a setting mode. The setting mode may comprise: connecting with the terminal through the network, acquiring the reference route information from the terminal, and determining an illumination mode based on whether current route information is consistent with the reference route information.

In an embodiment, the intelligent flashlight determines whether it is in the setting mode by reading the current setting data. Alternatively, when it is detected a selection operation of the user on the operation mode, if the selection operation is with respect to the setting mode, the setting mode is activated.

In an embodiment, since the intelligent flashlight is generally used at night, it may be determined whether the intelligent flashlight is in the setting mode based on the current time. For example, the intelligent flashlight may have time and date functions, and may have a preset time threshold. For example, in summer, the time threshold may be set to 20:00, in spring and autumn, the time threshold may be set to 19:00, and in winter, the time threshold may be set to 18:00. Then as long as the time passes the time threshold, the setting mode may be automatically activated. For example, in summer, as soon as it is detected that the time passes 20:00, the setting mode may be automatically activated. Alternatively, a time range may be preset. For example, in summer, the time range is from 20:00 to 5:00. Then, as long as the current time falls within the time range, the setting mode may be automatically activated.

In an embodiment, the intelligent flashlight may establish a connection with the intelligent terminal through the Bluetooth. Since the effective distance for the Bluetooth is short, if the intelligent flashlight is connected with the intelligent terminal, it is indicated that both of the intelligent flashlight and the intelligent terminal are in the same scenario. That is, the user may use the intelligent flashlight while using the terminal.

In an embodiment, the intelligent flashlight may establish a connection with the intelligent terminal through the WiFi (Wireless Fidelity). Similar to the Bluetooth, since the WiFi network is a local area network, the intelligent flashlight and the intelligent terminal may only be connected in a short distance.

In an embodiment, the intelligent flashlight establishes a connection with the intelligent terminal through an AP (Access Point).

In an embodiment, the intelligent flashlight establishes a connection with the intelligent terminal through a mobile network signal such as a 4G signal.

In the above connection methods with the WiFi, AP, or mobile network signal, the distance between the intelligent flashlight and the intelligent terminal may be determined by a satellite positioning method such as GPS (Global Positioning System) positioning, and a distance threshold may be set in advance. If the distance between the intelligent flashlight and the intelligent terminal is smaller than the distance threshold, it may be determined that the intelligent flashlight and the intelligent terminal are located in the same scenario, that is, the distance is short and they may be used at the same time.

In an embodiment, when the intelligent terminal is in a navigation state, such as a walking or riding navigation state, there will be route information of navigation. For example, when the user selects a departure place A and a destination place B, the intelligent terminal will automatically plan a route between the place A and the place B that meets the user's requirements, such as minimum number of traffic lights, minimum number of turns, a shortest distance to travel. The intelligent flashlight may acquire the reference route information from the intelligent terminal.

In step 102, current route information of the intelligent flashlight is acquired, it is determined whether the current route information is consistent with the reference route information, and a route determination result is generated.

In an embodiment, the intelligent flashlight may acquire, based on the positioning function, the current route information in real time while the user is travelling, and compare the current route information with the reference route information of the navigation to determine whether they are consistent.

In an embodiment, the intelligent flashlight may also acquire, from the associated intelligent terminal, the current route information while the user is travelling, and compare the current route information with the reference route information.

In step 103, an illumination mode of the intelligent flashlight is determined according to the route determination result.

In an embodiment, the terminal may store different illumination modes corresponding to the route determination results. For example, when the current route information is consistent with the reference route information, an illumination mode is set for the illumination, such that the user may feel confident to travel along the current direction and route. When the current route information is not consistent with the reference route information, and a deviation exists, it indicates that the user may be lost. Therefore, another illumination mode may be set for illumination to prompt the user to correct the route in time.

In an embodiment, a first illumination mode for indicating an error is set in advance. The illumination mode may be the color of the light. For example, when the current route is consistent with the reference route for the navigation, the light is set to be white; and when the current route deviates from the reference route for the navigation, the light is set to be green.

In an embodiment, different deviation directions may also correspond to different colors. For example, when the current route is consistent with the reference route and no deviation exists, the deviation direction of 0 is set to correspond to white, and the deviation directions of east, west, south and north respectively correspond to yellow, blue, green, and red. For example, when the current route deviates to the east of the reference route for the navigation, it is illuminated in yellow. The color of the light corresponding to each direction may be set based on the user's personal preferences and habits.

In an embodiment, the illumination mode may be the brightness of the light, such as high brightness and medium brightness. The brightness of the light may also be combined with the color of the light. For example, when the current route is consistent with the reference route for the navigation, it is set to correspond to white light of low brightness; and when the current route deviates to the east of the reference route of navigation, the corresponding color is set to be yellow and the brightness is set to be medium brightness.

In an embodiment, the illumination mode may be a flashing manner, such as high-frequency flashing and low-frequency flashing. The flashing manner may also be combined with the color of the light. For example, when the current route is consistent with the reference route for navigation, it is set to correspond to white light flashing at a medium frequency; and when the current route deviates to the east of the reference route of navigation, the corresponding color is yellow, and the flashing manner is low-frequency flashing.

In an exemplary scenario, as shown in FIG. 1B, an intelligent flashlight and a smart phone are used as an example for illustration. In the scenario shown in FIG. 1B, an intelligent flashlight is included as the intelligent device, and the intelligent flashlight is associated with the intelligent phone as the terminal through a network.

The intelligent flashlight reads time information which is 20:01 on Aug. 22, 2017 and then reads a pre-set time threshold, which is 20:00. The current time has passed the pre-set time threshold, the setting mode is activated. The intelligent flashlight sends a route acquiring instruction to the associated smart phone in the navigation state, and then acquires walking reference route information for the smart phone's current navigation. The intelligent flashlight acquires, through its own positioning function, current route information for the current travel, and determines whether the current route information is consistent with the reference route information. If the current route information is consistent with the reference route information, the intelligent flashlight reads the illumination mode corresponding to the result of being consistent, and illuminates with the pre-set white light. If the current route information is not consistent with the reference route information, the intelligent flashlight determines that the current route information deviates from the direction of the reference route information, to the east, then reads the previously stored correspondence between the direction and the illumination mode, determines that green light corresponds to the deviation direction, and illuminates with green light.

Details on how to illuminate with the intelligent flashlight may refer to the embodiments below.

So far, in the above method provided by the embodiment of the present disclosure, the intelligent flashlight may be associated with the intelligent terminal; when the intelligent flashlight is in the setting mode, the intelligent flashlight acquires the reference route information for navigation from the terminal in the navigation state, determines whether the current route information is consistent with the reference route information, and determines an illumination mode according to whether the information is consistent. It can solve the problem in the related art that when the user goes in a wrong direction in an insufficient light condition, he can rarely get relevant prompts. It can give the user prompts by adjusting the illumination mode, indicate whether the current travelling direction is correct, and prompt the user to timely correct the wrong direction or route, so as to avoid the user getting lost and to ensure the personal safety of the user.

Technical solutions provided by the embodiments of the present disclosure are described as follows with specific embodiments.

Figure 2:
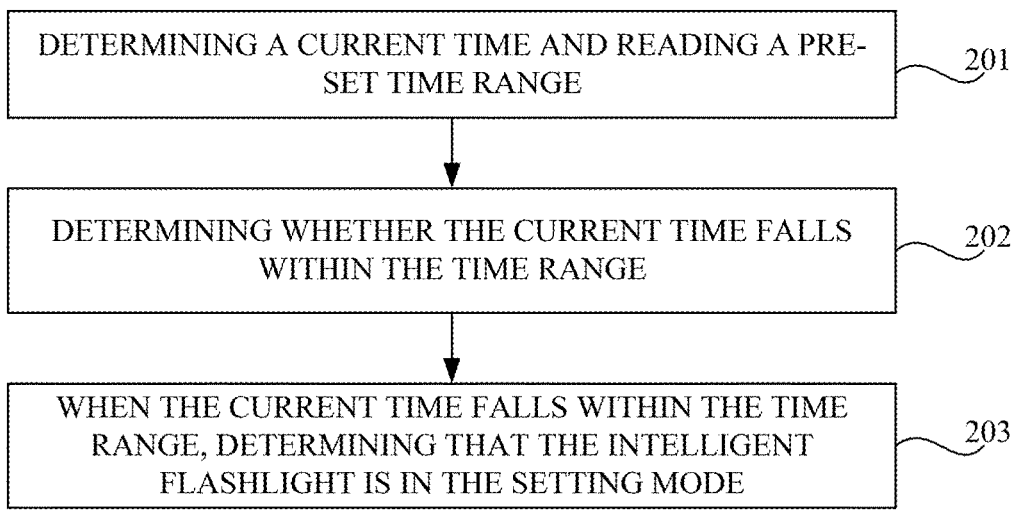
FIG. 2 is a flowchart illustrating another illumination method for an intelligent flashlight according to an exemplary embodiment.

FIG. 2 is a flowchart illustrating another illumination method for an intelligent flashlight according to an exemplary embodiment. This embodiment will be described with respect to an example of how to determine whether the intelligent flashlight is in a setting mode with the above method provided in the embodiment of the disclosure. As shown in FIG. 2, the method includes the following steps 201-203.

In step 201, a current time is determined and a pre-set time range is read.

In an embodiment, the intelligent flashlight may read the system time as the current time, and may also acquire the current time from the associated terminal.

In an embodiment, the intelligent flashlight may store a pre-set time range. The time range usually refers to a time period of nighttime when the light is insufficient and illumination with a flashlight is required, such as 17:30-7:00 in winter.

In an embodiment, the pre-set time range may also be stored in the associated terminal and acquired from the terminal.

In step 202, it is determined whether the current time falls within the time range.

In an embodiment, the intelligent flashlight determines whether the current time falls within the pre-set time range.

In step 203, when the current time falls within the time range, it is determined that the intelligent flashlight is in the setting mode.

In an embodiment, when the current time falls within the pre-set time range, the intelligent flashlight automatically activates the setting mode. That is, the intelligent flashlight determines whether the current route information is consistent with the route information for navigation while illuminating, and gives a prompt when the current route information is not consistent with the route information for navigation.

In this embodiment, whether the intelligent flashlight is in the setting mode may be accurately determined according to whether the current time falls within the pre-set time range, such that a prompt may be given when the current route information is not consistent with the route information for navigation. Thereby it can lower the safety risk for the user walking at night and improve the user experience.

Figure 3:
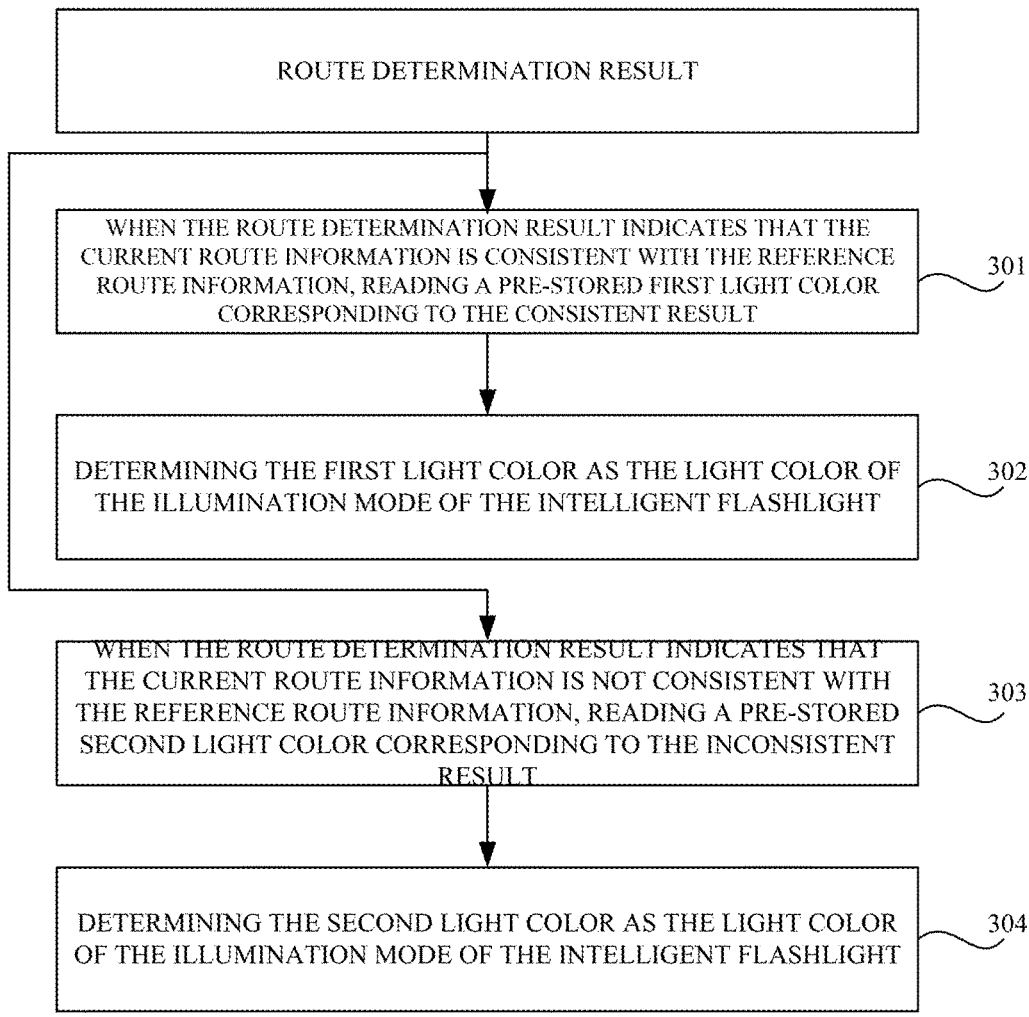
FIG. 3 is a flowchart illustrating another illumination method for an intelligent flashlight according to an exemplary embodiment.

FIG. 3 is a flowchart illustrating another illumination method for an intelligent flashlight according to an exemplary embodiment. This embodiment will be described with respect to an example of how to determine the illumination mode of the intelligent flashlight according to the route determination result, with the above method provided in the embodiment of the disclosure. As shown in FIG. 3, the method includes the following steps 301-304.

In step 301, when the route determination result indicates that the current route information is consistent with the reference route information, a pre-stored first light color corresponding to the consistent result is read.

In step 302, the first light color is determined as the light color of the illumination mode of the intelligent flashlight.

In an embodiment, a light color for prompting may be set in the intelligent flashlight. For example, when the current route information is consistent with the ref6erence route information, the illumination is performed with white light, and when the current route information is not consistent with the reference route information, the illumination is performed with yellow light. The light color may be set in advance based on the preference of the user.

In step 303, when the route determination result indicates that the current route information is inconsistent with the reference route information, a pre-stored second light color corresponding to the inconsistent result is read.

In step 304, the second light color is determined as the light color of the illumination mode of the intelligent flashlight.

In another embodiment, the light color corresponds to the deviation direction.

In this case, in step 301', when the route determination result indicates that the current route information is consistent with the reference route information, a current direction of the current route information is determined.

In step 302', a pre-stored first correspondence between the direction and the light color is read, and a third light color corresponding to the current direction is determined.

That is to say, the light color may also correspond to the direction. The first flashlight pre-stores a first correspondence between the direction and the light color. The first correspondence may be, for example, the current direction is north, and the corresponding light color is red.

In step 303', the third light color is determined as the light color of the illumination mode of the intelligent flashlight.

In step 304', when the route determination result indicates that the current route information is not consistent with the reference route information, a deviation direction of the current route information from the reference route information is determined.

In an embodiment, the light color is different depending on the deviation direction of the current route information from the reference route information.

In step 305', the first correspondence is read and a fourth light color corresponding to the deviation direction is determined.

In step 306', the fourth light color is determined as the light color of the illumination mode of the intelligent flashlight.

In an embodiment, the first correspondence is pre-stored in the intelligent flashlight, and the first correspondence is the correspondence between the deviation direction and the light color.

The above steps 301'-306' are not shown in FIG. 3.

In this embodiment, through the above steps 301-304, different prompts may be given through different light colors according to whether the current route information is consistent with the reference route information. The light color may be a preset single color, or may be different colors depending on different directions. Thereby, it can not only prompt the user whether the current route is wrong, but also can, when the current route is wrong, accurately prompt the direction of the wrong route, so as to facilitate the user to timely adjust the direction and go back to the right route and to avoid loss of labor and material resources caused by getting lost.

Figure 4:
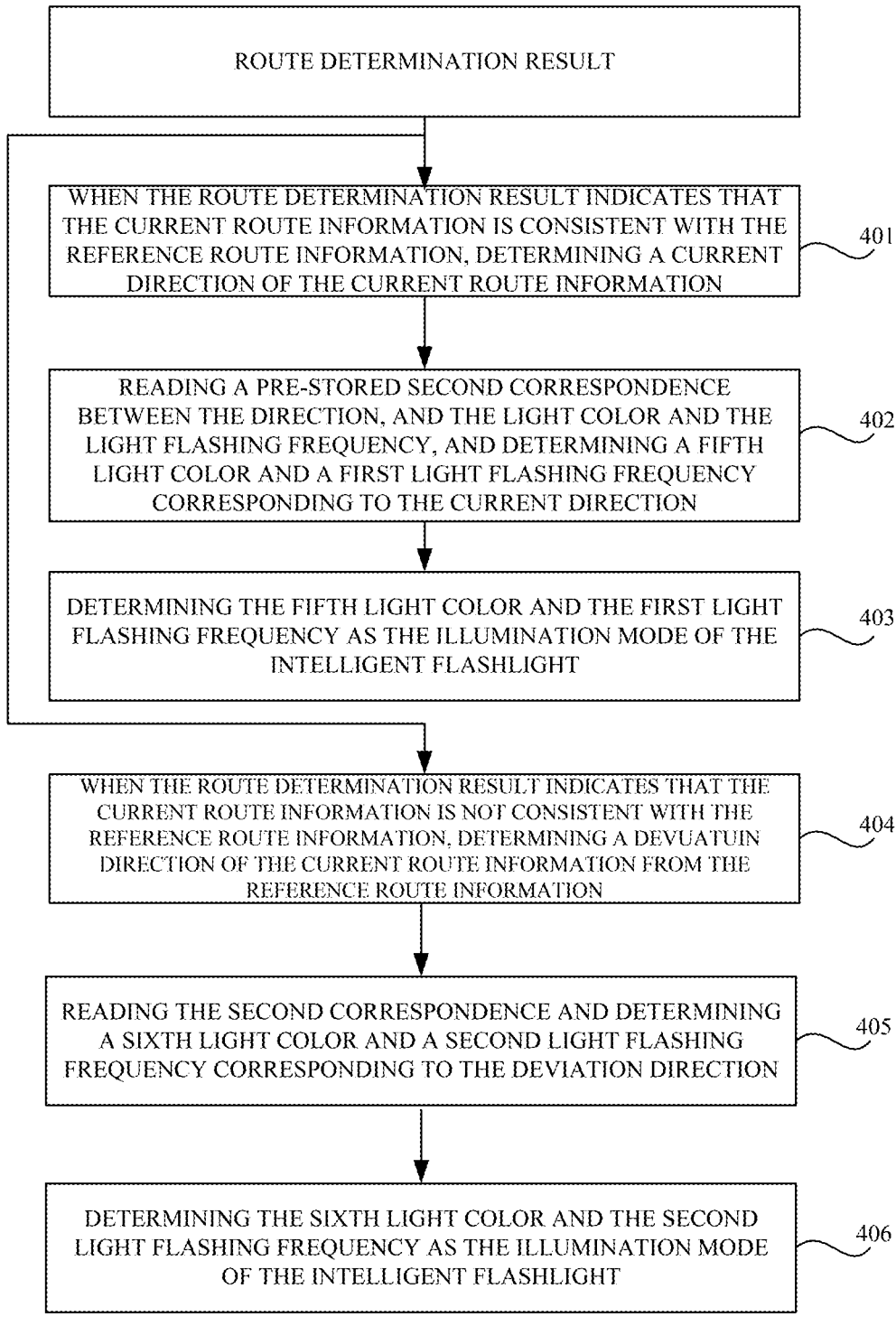
FIG. 4 is a flowchart illustrating another illumination method for an intelligent flashlight according to an exemplary embodiment.

FIG. 4 is a flowchart illustrating another illumination method for an intelligent flashlight according to an exemplary embodiment. This embodiment will be described with respect to an example of how to determine the illumination mode of the intelligent flashlight according to the route determination result, with the above method provided in the embodiment of the disclosure. As shown in FIG. 4, the method includes the following steps 401-406.

In step 401, when the route determination result indicates that the current route information is consistent with the reference route information, a current direction of the current route information is determined.

In step 402, a pre-stored second correspondence between the direction, and the light color and the light flashing frequency is read, a fifth light color and a first light flashing frequency corresponding to the current direction are determined.

In an embodiment, a second correspondence is pre-stored in the intelligent flashlight, the second correspondence being a correspondence between the current direction, and the light color and the light flashing frequency.

In step 403, the fifth light color and the first light flashing frequency are determined as the illumination mode of the intelligent flashlight.

In an embodiment, the fifth light color and the first light flashing frequency corresponding to the current direction are determined as the light color and the light flashing frequency of the illumination mode of the intelligent flashlight. That is, the intelligent flashlight is controlled to emit a light in the fifth light color and flashing at the first light flashing frequency.

In step 404, when the route determination result indicates that the current route information is not consistent with the reference route information, a deviation direction of the current route information from the reference route information is determined.

In step 405, the second correspondence is read, and a sixth light color and a second light flashing frequency corresponding to the deviation direction are determined.

In an embodiment, a second correspondence is pre-stored in the intelligent flashlight. The second correspondence is a correspondence between the deviation direction of the current route information from the reference route information, and the light color and the light flashing frequency.

In step 406, the sixth light color and the second light flashing frequency are determined as the light color and the light flashing frequency of the illumination mode of the intelligent flashlight.

In an embodiment, the light color of the intelligent flashlight is adjusted to the sixth light color, and the light emitted by the intelligent flashlight is flashed at the second light flashing frequency.

In this embodiment, through the above steps 401 to 406, prompts are given in a manner that combines the light color and the light flashing frequency, such as high-frequency flashing, low-frequency flashing, and the like. When the current route information is consistent or is not consistent with the reference route information, the user prompt may be given by combining different light colors and light flashing frequencies. For example, when the current route deviates to the east of the navigation route, the corresponding color is yellow, and the flashing manner is low-frequency flashing. Compared with the prompting method with only light color, the method of combining the light color with the light flashing frequency can be more prominent, enable the user to immediately realize that the travelling direction is wrong, and can facilitate the user to adjust the direction in time.

Figure 5:
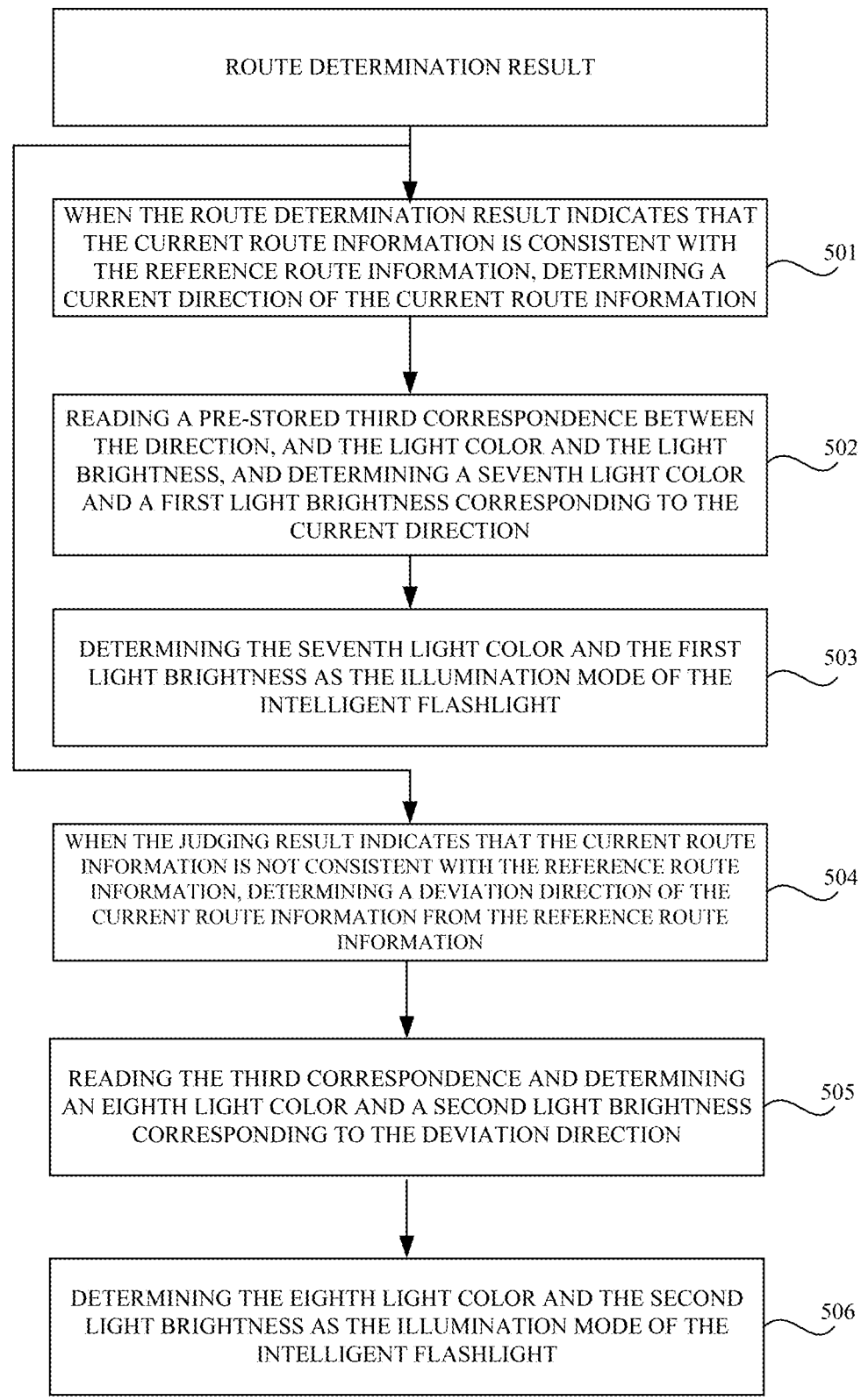
FIG. 5 is a flowchart illustrating another illumination method for an intelligent flashlight according to an exemplary embodiment.

FIG. 5 is a flowchart illustrating another illumination method for an intelligent flashlight according to an exemplary embodiment. This embodiment will be described with respect to an example of how to determine the illumination mode of the intelligent flashlight according to the route determination result, with the above method provided in the embodiment of the disclosure. As shown in FIG. 5, the method includes the following steps 501-506.

In step 501, when the route determination result indicates that the current route information is consistent with the reference route information, a current direction of the current route information is determined.

In step 502, a pre-stored third correspondence between the direction, and the light color and the light brightness is read, and a seventh light color and a first light brightness corresponding to the current direction are determined.

A third correspondence may also be stored in the intelligent flashlight. The third correspondence includes the current direction and the corresponding light color and light brightness.

In step 503, the seventh light color and the first light brightness are determined as the light color and the light brightness of the illumination mode of the intelligent flashlight.

In an embodiment, the light color of the intelligent flashlight is adjusted to the seventh light color corresponding to the current direction, and an illumination with the light color and the first light brightness is performed.

In step 504, when the route determination result indicates that the current route information is not consistent with the reference route information, a deviation direction of the current route information from the reference route information is determined.

In step 505, the third correspondence is read, and an eighth light color and a second light brightness are determined.

In an embodiment, a third correspondence is pre-stored in the intelligent flashlight, including the deviation direction of the current route information from the reference route information and the corresponding light color and light brightness.

In step 506, the eighth light color and the second light brightness are determined as the light color and the light brightness of the illumination mode of the intelligent flashlight.

In an embodiment, the light color of the intelligent flashlight is adjusted to the eighth light color and the light is illuminated with the second light brightness.

In this embodiment, through the above steps 501-506, prompts are given in a manner that combines the light color and the light brightness, such as high brightness and medium brightness, and the like. For example, when the current route deviates to the east of the navigation route, the corresponding color is yellow, and the light brightness of the illumination mode is high brightness. No matter the current route information is consistent or is not consistent with the reference route information, the user prompt may be given by combining the light color and the light brightness. Compared with the prompting method with only light color, the method of combining the light color with the light brightness can be more prominent, enable the user to immediately realize that the travelling direction is wrong, and can facilitate the user to adjust the direction in time.

Figure 6:
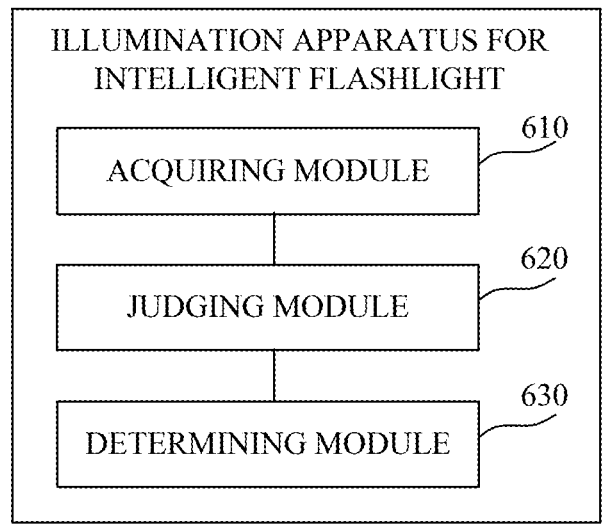
FIG. 6 is a block diagram illustrating an illumination apparatus for an intelligent flashlight according to an exemplary embodiment.

FIG. 6 is a block diagram illustrating an illumination apparatus for an intelligent flashlight according to an exemplary embodiment. As shown in FIG. 6, the illumination apparatus for an intelligent flashlight includes an acquiring module 610, a judging module 620 and a determining module 630.

The acquiring module 610 is configured to acquire a current operation mode of the intelligent flashlight, and when the intelligent flashlight is in a setting mode, acquire reference route information for current navigation from a terminal associated with the intelligent flashlight and in a navigation state.

The judging module 620 is configured to acquire current route information of the intelligent flashlight, determine whether the current route information is consistent with the reference route information acquired by the acquiring module 610, and generate a route determination result.

The determining module 630 is configured to determine an illumination mode of the intelligent flashlight according to the route determination result.

Figure 7:
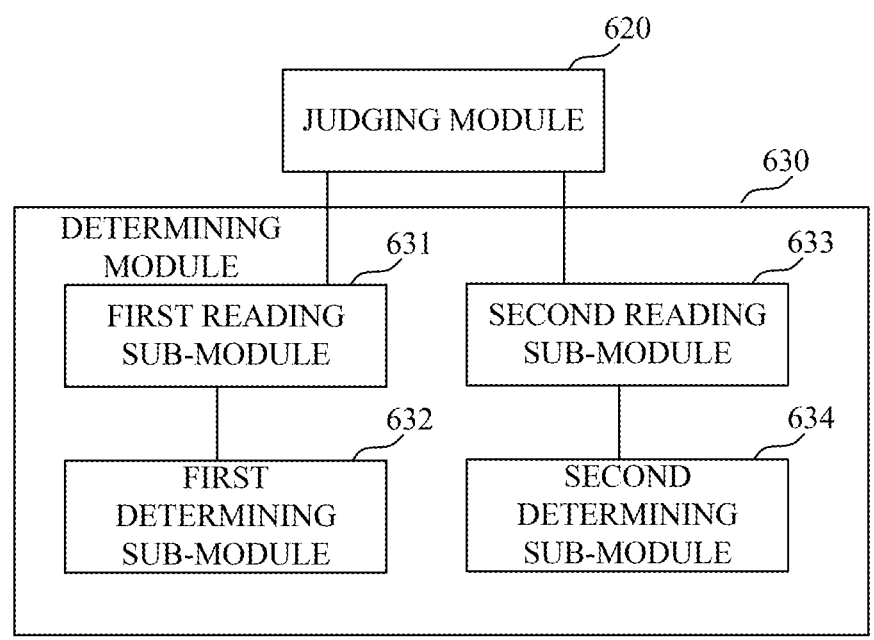
FIG. 7 is a block diagram illustrating another illumination apparatus for an intelligent flashlight according to an exemplary embodiment.

FIG. 7 is a block diagram illustrating another illumination apparatus for an intelligent flashlight according to an exemplary embodiment. As shown in FIG. 7, based on the embodiment as shown in the above FIG. 6, in an embodiment, the illumination mode includes a light color, and the determining module 630 may include: a first reading sub-module 631, a first determining sub-module 632, a second reading sub-module 633 and a second determining sub-module 634.

The first reading sub-module 631 is configured to, when the route determination result indicates that the current route information is consistent with the reference route information, read a pre-stored first light color corresponding to the consistent result.

The first determining sub-module 632 is configured to determine the first light color read by the first reading sub-module 631 as the light color of the illumination mode of the intelligent flashlight.

The second reading sub-module 633 is configured to, when the route determination result indicates that the current route information is not consistent with the reference route information, read a pre-stored second light color corresponding to the inconsistent result.

The second determining sub-module 634 is configured to determine the second light color read by the second reading sub-module 633 as the light color of the illumination mode of the intelligent flashlight.

Figure 8:
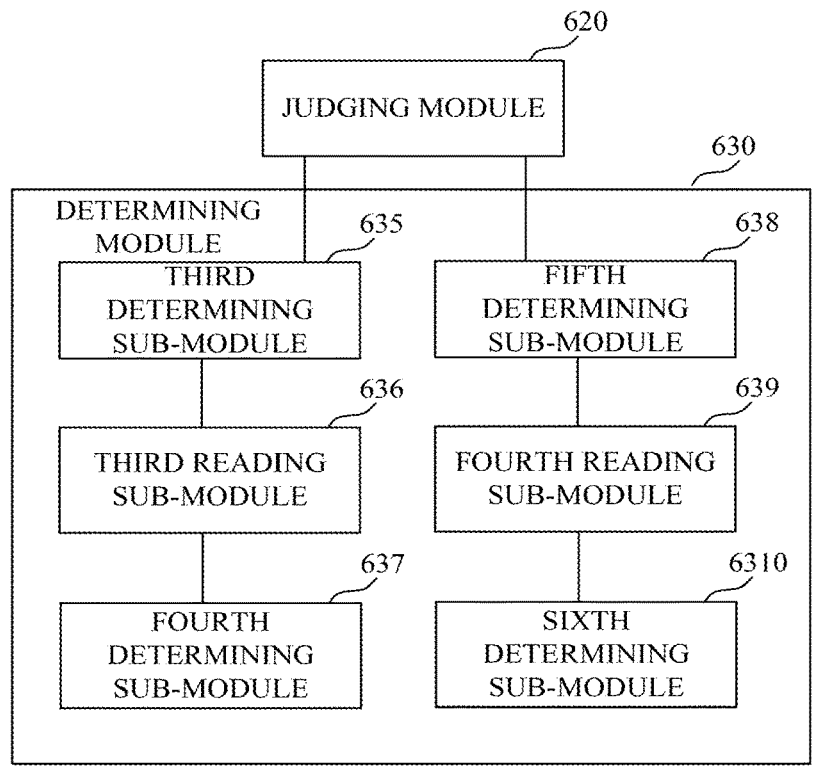
FIG. 8 is a block diagram illustrating another illumination apparatus for an intelligent flashlight according to an exemplary embodiment.

FIG. 8 is a block diagram illustrating another illumination apparatus for an intelligent flashlight according to an exemplary embodiment. As shown in FIG. 8, based on the embodiment as shown in the above FIG. 6, in an embodiment, the illumination mode includes a light color corresponding to a direction, and the determining module 630 may include: a third determining sub-module 635, a third reading sub-module 636, a fourth determining sub-module 637, a fifth determining sub-module 638, a fourth reading sub-module 639 and a sixth determining sub-module 6310.

The third determining sub-module 635 is configured to, when the route determination result indicates that the current route information is consistent with the reference route information, determine a current direction of the current route information.

The third reading sub-module 636 is configured to read a pre-stored first correspondence between the direction and the light color, and determine a third light color corresponding to the current direction determined by the third determining sub-module 635.

The fourth determining sub-module 637 is configured to determine the third light color read by the third reading sub-module 636 as the light color of the illumination mode of the intelligent flashlight.

The fifth determining sub-module 638 is configured to, when the route determination result indicates that the current route information is not consistent with the reference route information, determine a deviation direction of the current route information from the reference route information.

The fourth reading sub-module 639 is configured to read the first correspondence, and determine a fourth light color corresponding to the deviation direction determined by the fifth determining sub-module 638.

The sixth determining sub-module 6310 is configured to determine the fourth light color read by the fourth reading sub-module 639 as the light color of the illumination mode of the intelligent flashlight.

Figure 9:
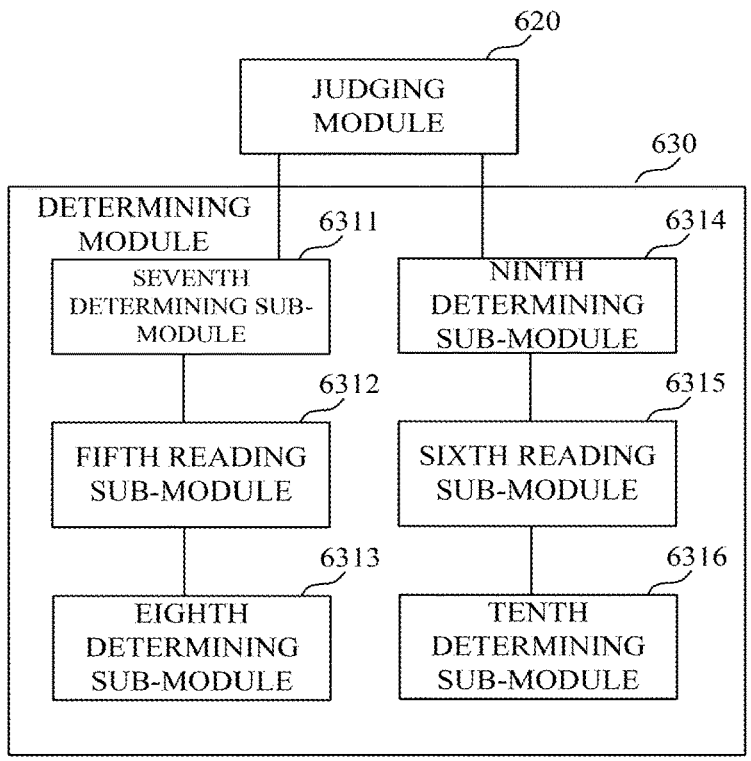
FIG. 9 is a block diagram illustrating another illumination apparatus for an intelligent flashlight according to an exemplary embodiment.

FIG. 9 is a block diagram illustrating another illumination apparatus for an intelligent flashlight according to an exemplary embodiment. As shown in FIG. 9, based on the embodiment as shown in the above FIG. 6, in an embodiment, the illumination mode includes a light color and a light flashing frequency corresponding to a direction, and the determining module 630 may include: a seventh determining sub-module 6311, a fifth reading sub-module 6312, an eighth determining sub-module 6313, a ninth determining sub-module 6314, a sixth reading sub-module 6315 and a tenth determining sub-module 6316.

The seventh determining sub-module 6311 is configured to, when the route determination result indicates that the current route information is consistent with the reference route information, determine a current direction of the current route information.

The fifth reading sub-module 6312 is configured to read a pre-stored second correspondence between the direction, and the light color and the light flashing frequency, and determine a fifth light color and a first light flashing frequency corresponding to the current direction determined by the seventh determining sub-module 6311.

The eighth determining sub-module 6313 is configured to determine the fifth light color and the first light flashing frequency read by the fifth reading sub-module 6312 as the light color and the light flashing frequency of the illumination mode of the intelligent flashlight.

The ninth determining sub-module 6314 is configured to, when the route determination result indicates that the current route information is not consistent with the reference route information, determine a deviation direction of the current route information from the reference route information.

The sixth reading sub-module 6315 is configured to read the second correspondence and determine a sixth light color and a second light flashing frequency corresponding to the deviation direction determined by the ninth determining sub-module 6314.

The tenth determining sub-module 6316 is configured to determine the sixth light color and the second light flashing frequency read by the sixth reading sub-module 6315 as the light color and the light flashing frequency of the illumination mode of the intelligent flashlight.

Figure 10:
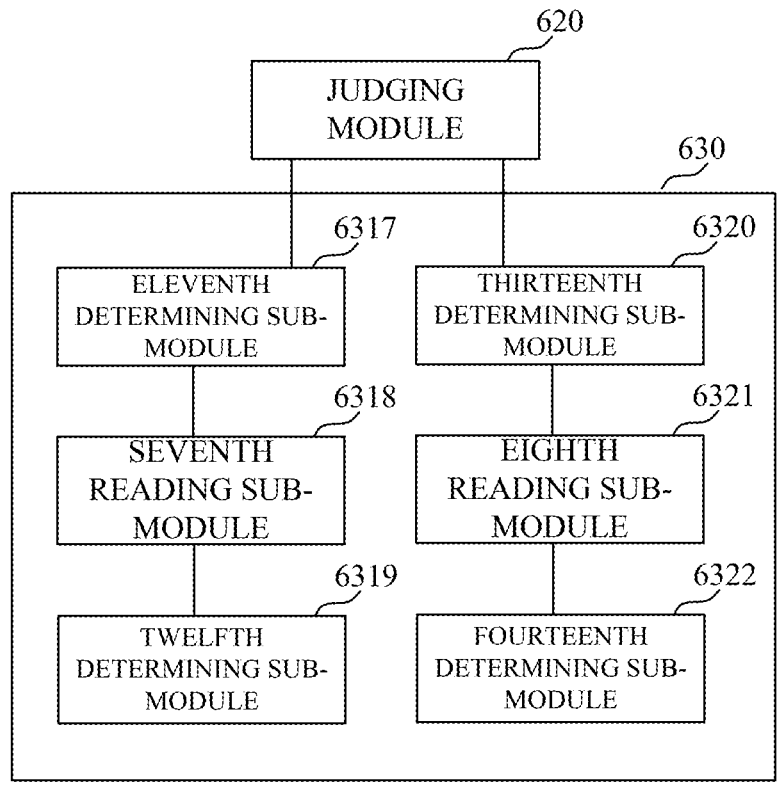
FIG. 10 is a block diagram illustrating another illumination apparatus for an intelligent flashlight according to an exemplary embodiment.

FIG. 10 is a block diagram illustrating another illumination apparatus for an intelligent flashlight according to an exemplary embodiment. As shown in FIG. 10, based on the embodiment as shown in the above FIG. 6, in an embodiment, the illumination mode includes a light color and a light brightness corresponding to a direction, and the determining module 630 may include: an eleventh determining sub-module 6317, a seventh reading sub-module 6318, a twelfth determining sub-module 6319, a thirteenth determining sub-module 6320, an eighth reading sub-module 6321 and a fourteenth determining sub-module 6322.

The eleventh determining sub-module 6317 is configured to, when the route determination result indicates that the current route information is consistent with the reference route information, determine a current direction of the current route information.

The seventh reading sub-module 6318 is configured to read a pre-stored third correspondence between the direction, and the light color and light brightness, and determine a seventh light color and a first light brightness corresponding to the current direction determined by the eleventh determining sub-module 6317.

The twelfth determining sub-module 6319 is configured to determine the seventh light color and the first light brightness read by the seventh reading sub-module 6318 as the light color and the light brightness of the illumination mode of the intelligent flashlight.

The thirteenth determining sub-module 6320 is configured to, when the route determination result indicates that the current route information is not consistent with the reference route information, determine a deviation direction of the current route information from the reference route information.

The eighth reading sub-module 6321 is configured to read the third correspondence and determine an eighth light color and a second light brightness corresponding to the deviation direction determined by the thirteenth determining sub-module 6320.

The fourteenth determining sub-module 6322 is configured to determine the eighth light color and the second light brightness read by the eighth reading sub-module 6321 as the light color and the light brightness of the illumination mode of the intelligent flashlight.

Figure 11:
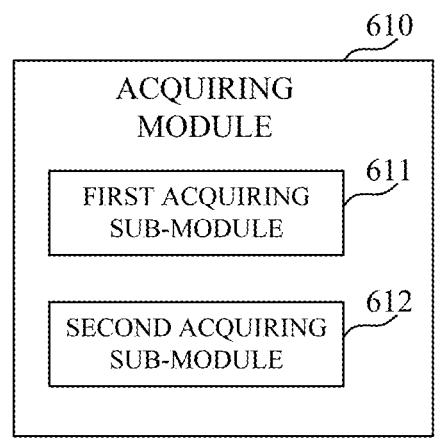
FIG. 11 is a block diagram illustrating another illumination apparatus for an intelligent flashlight according to an exemplary embodiment.

FIG. 11 is a block diagram illustrating another illumination apparatus for an intelligent flashlight according to an exemplary embodiment. As shown in FIG. 11, based on the embodiment as shown in the above FIG. 6, in an embodiment, the acquiring module 610 may include: a first acquiring sub-module 611 and a second acquiring sub-module 612.

The first acquiring sub-module 611 is configured to acquire, through a positioning function of the intelligent flashlight, the current route information while the user is travelling; or the second acquiring sub-module 612 is configured to acquire, from the terminal, the current route information while the user is travelling.

Figure 12:
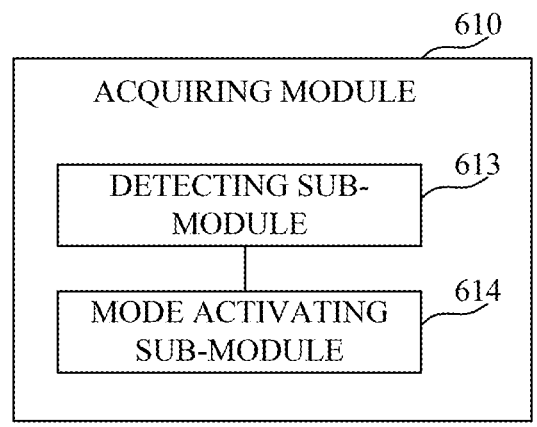
FIG. 12 is a block diagram illustrating another illumination apparatus for an intelligent flashlight according to an exemplary embodiment.

FIG. 12 is a block diagram illustrating another illumination apparatus for an intelligent flashlight according to an exemplary embodiment. As shown in FIG. 12, based on the embodiment as shown in the above FIG. 6, in an embodiment, the acquiring module 610 may include: a detecting sub-module 613 and a mode activating sub-module 614.

The detecting sub-module 613 is configured to detect a selection operation of the user on the operation mode of the intelligent flashlight.

The mode entering sub-module 614 is configured to, when the selection operation detected by the detecting sub-module 613 is with respect to the setting mode, activate the setting mode.

Figure 13:
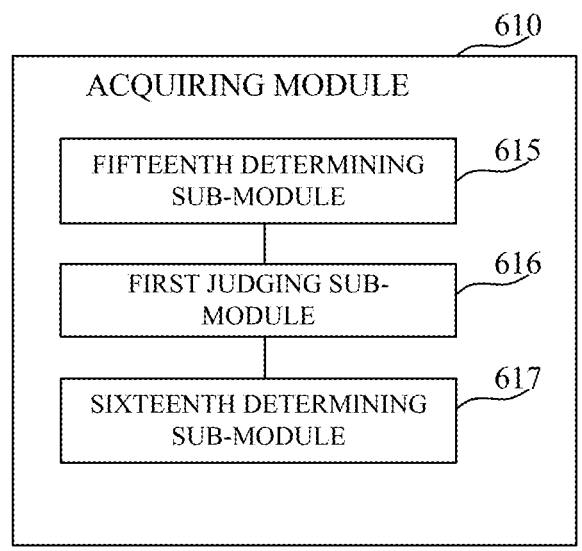
FIG. 13 is a block diagram illustrating another illumination apparatus for an intelligent flashlight according to an exemplary embodiment.

FIG. 13 is a block diagram illustrating another illumination apparatus for an intelligent flashlight according to an exemplary embodiment. As shown in FIG. 13, based on the embodiment as shown in the above FIG. 6, in an embodiment, the acquiring module 610 may include: a fifteenth determining sub-module 615, a first judging sub-module 616 and a sixteenth determining sub-module 617.

The fifteenth determining sub-module 615 is configured to determine a current time and read a pre-set time range.

The first judging sub-module 616 is configured to determine whether the current time determined by the fifteenth determining sub-module 615 falls within the time range.

The sixteenth determining sub-module 617 is configured to, when the current time falls within the time range as determined by the first judging sub-module 616, determine that the intelligent flashlight is in the setting mode.

With respect to the apparatuses in the above embodiments, the specific manners for performing operations for individual modules therein have been described in detail in the embodiments regarding the relevant methods, which will not be elaborated herein.

Figure 14:
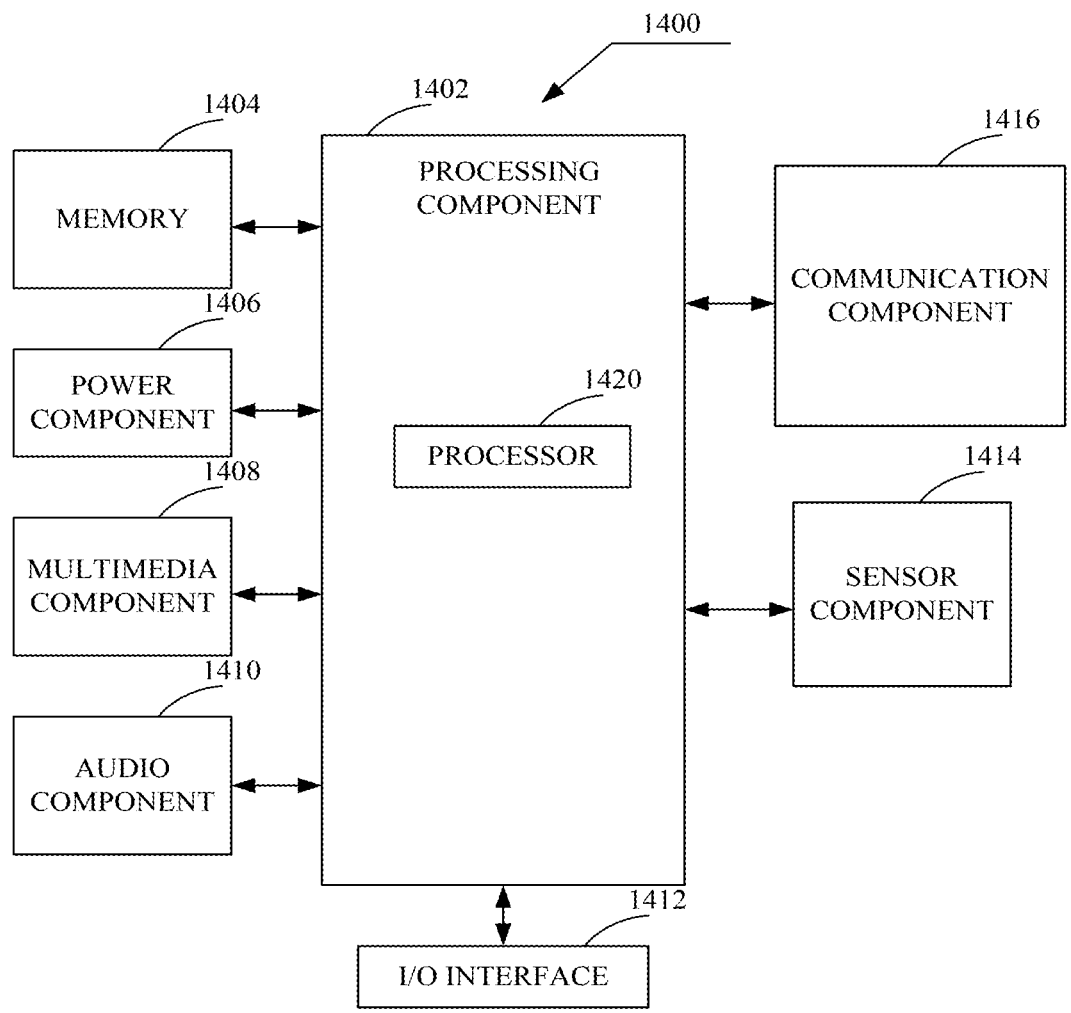
FIG. 14 is a block diagram illustrating an illumination apparatus applicable to an intelligent flashlight according to an exemplary embodiment.
Figure 15:
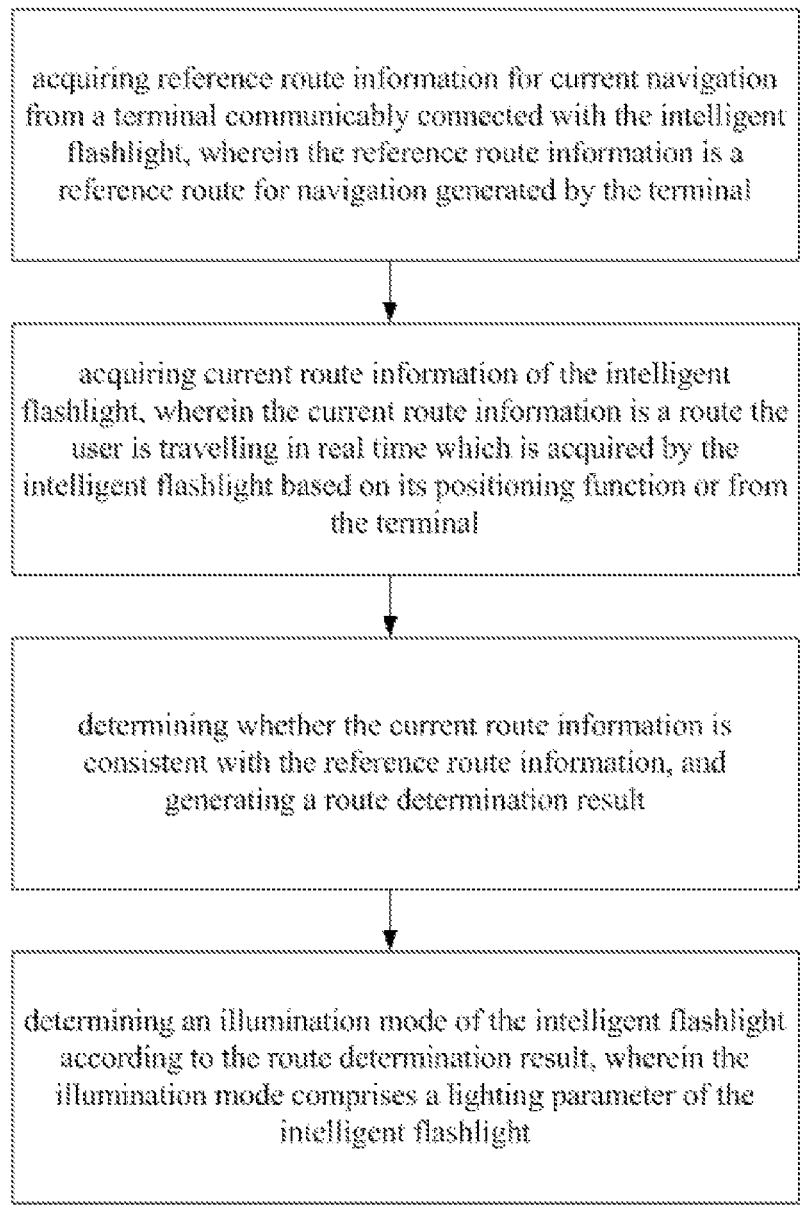
FIG. 15 is a flowchart illustrating another illumination method for an intelligent flashlight according to an exemplary embodiment.

FIG. 14 is a block diagram illustrating an illumination apparatus applicable to an intelligent flashlight according to an exemplary embodiment. For example, the apparatus 1400 may be user equipment such as a mobile phone, a computer, a digital broadcast terminal, a messaging device, a gaming console, a tablet, a medical device, exercise equipment, a personal digital assistant, and the like.

Referring to FIG. 14, the apparatus 1400 may include one or more of the following components: a processing component 1402, a memory 1404, a power component 1406, a multimedia component 1408, an audio component 1410, an input/output (I/O) interface 1412, a sensor component 1414, and a communication component 1416.

The processing component 1402 typically controls overall operations of the apparatus 1400, such as the operations associated with display, telephone calls, data communications, camera operations, and recording operations. The processing component 1402 may include one or more processors 1420 to execute instructions to perform all or part of the steps in the above described methods. Moreover, the processing component 1402 may include one or more modules which facilitate the interaction between the processing component 1402 and other components. For instance, the processing component 1402 may include a multimedia module to facilitate the interaction between the multimedia component 1408 and the processing component 1402.

The memory 1404 is configured to store various types of data to support the operation of the apparatus 1400. Examples of such data include instructions for any applications or methods operated on the apparatus 1400, contact data, phonebook data, messages, pictures, video, etc. The memory 1404 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1406 provides power to various components of the apparatus 1400. The power component 1406 may include a power management system, one or more power sources, and any other components associated with the generation, management, and distribution of power in the apparatus 1400.

The multimedia component 1408 includes a screen providing an output interface between the apparatus 1400 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 1408 includes a front camera and/or a rear camera. The front camera and/or the rear camera may receive external multimedia data while the apparatus 1400 is in an operation mode, such as a photographing mode or a video mode. Each of the front camera and the rear camera may be a fixed optical lens system or have focus and optical zoom capability.

The audio component 1410 is configured to output and/or input audio signals. For example, the audio component 1410 includes a microphone ("MIC") configured to receive an external audio signal when the apparatus 1400 is in an operation mode, such as a call mode, a recording mode, and a voice recognition mode. The received audio signal may be further stored in the memory 1404 or transmitted via the communication component 1416. In some embodiments, the audio component 1410 further includes a speaker to output audio signals.

The I/O interface 1412 provides an interface between the processing component 1402 and peripheral interface modules, such as a keyboard, a click wheel, buttons, and the like. The buttons may include, but are not limited to, a home button, a volume button, a starting button, and a locking button.

The sensor component 1414 includes one or more sensors to provide status assessments of various aspects of the apparatus 1400. For instance, the sensor component 1414 may detect an open/closed status of the apparatus 1400, relative positioning of components, e.g., the display and the keypad, of the apparatus 1400, a change in position of the apparatus 1400 or a component of the apparatus 1400, a presence or absence of user contact with the apparatus 1400, an orientation or an acceleration/deceleration of the apparatus 1400, and a change in temperature of the apparatus 1400. The sensor component 1414 may include a proximity sensor configured to detect the presence of nearby objects without any physical contact. The sensor component 1414 may also include a light sensor, such as a CMOS or CCD image sensor, for use in imaging applications. In some embodiments, the sensor component 1414 may also include an accelerometer sensor, a gyroscope sensor, a magnetic sensor, a pressure sensor, or a temperature sensor.

The communication component 1416 is configured to facilitate communication, wired or wirelessly, between the apparatus 1400 and other devices. The apparatus 1400 can access a wireless network based on a communication standard, such as WiFi, 2G, or 3G, or a combination thereof. In one exemplary embodiment, the communication component 1416 receives a broadcast signal or broadcast associated information from an external broadcast management system via a broadcast channel. In one exemplary embodiment, the communication component 1416 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the apparatus 1400 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium including instructions, such as included in the memory 1404, executable by the processor 1420 in the apparatus 1400, for performing the above methods. For example, the non-transitory computer-readable storage medium may be a ROM, a RAM, a CD-ROM, a magnetic tape, a floppy disc, an optical data storage device, and the like.

The processor 1420 is configured to:

acquire reference route information for current navigation from a terminal associated with the intelligent flashlight;

acquire current route information of the intelligent flashlight;

determine whether the current route information is consistent with the reference route information, and generate a route determination result; and determine an illumination mode of the intelligent flashlight according to the route determination result.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the present disclosure as come within known or customary practice in the art. It is intended that the specification and examples be considered as exemplary only, with a true scope and spirit of the disclosure being indicated by the following claims.

It will be appreciated that the present disclosure is not limited to the exact construction that has been described above and illustrated in the accompanying drawings, and that various modifications and changes may be made without departing from the scope thereof. It is intended that the scope of the disclosure only be limited by the appended claims.

What is claimed is:

1. An illumination method for an intelligent flashlight, comprising:

acquiring reference route information, via an acquiring module, for current navigation from a terminal communicably connected with the intelligent flashlight, wherein the reference route information is a reference route for navigation generated by the terminal;

acquiring current route information of the intelligent flashlight via a judging module, wherein the current route information is a route that a user is travelling in real time which is acquired by the intelligent flashlight based on its positioning function or from the terminal;

determining, via the judging module, whether the current route information is consistent with the reference route information, and generating a route determination result; and determining an illumination mode of the intelligent flashlight, via a determining module, according to the route determination result, wherein the illumination mode comprises a lighting parameter of the intelligent flashlight.

2. The method according to claim 1, wherein the illumination mode comprises a light color of light emitted from the intelligent flashlight, and determining an illumination mode of the intelligent flashlight according to the route determination result comprises:

acquiring a pre-stored first light color and setting the first light color as the light color of the illumination mode of the intelligent flashlight, when the route determination result indicates that the current route information is consistent with the reference route information; and acquiring a pre-stored second light color and setting the second light color as the light color of the illumination mode of the intelligent flashlight, when the route determination result indicates that the current route information is not consistent with the reference route information.

3. The method according to claim 1, wherein the illumination mode comprises a light color of light emitted from the intelligent flashlight, and wherein determining an illumination mode of the intelligent flashlight according to the route determination result comprises:

acquiring a pre-stored third light color associated with a navigation direction of the current route information and setting the third light color as the light color of the illumination mode of the intelligent flashlight, when the route determination result indicates that the current route information is consistent with the reference route information; and acquiring a pre-stored fourth light color associated with a deviation of the current route information from the reference route information and setting the fourth light color as the light color of the illumination mode of the intelligent flashlight, when the route determination result indicates that the current route information is not consistent with the reference route information.

4. The method according to claim 1, wherein the illumination mode comprises a light color and a light flashing frequency of light emitted from the intelligent flashlight, and wherein determining an illumination mode of the intelligent flashlight according to the route determination result comprises:

acquiring a pre-stored fifth light color and a pre-stored first light flashing frequency associated with a navigation direction of the current route information and setting the fifth light color and the first light flashing frequency as the light color and the light flashing frequency of the illumination mode of the intelligent flashlight, when the route determination result indicates that the current route information is consistent with the reference route information;

acquiring a pre-stored sixth light color and a pre-stored second light flashing frequency associated with a deviation of the current route information from the reference route information and setting the sixth light color and the second light flashing frequency as the light color and the light flashing frequency of the illumination mode of the intelligent flashlight, when the route determination result indicates that the current route information is not consistent with the reference route information.

5. The method according to claim 1, wherein the illumination mode comprises a light color and a light brightness of light emitted from the intelligent flashlight, and wherein determining an illumination mode of the intelligent flashlight according to the route determination result comprises:

acquiring a pre-stored seventh light color and a pre-stored first light brightness associated with a navigation direction of the current route information and setting the seventh light color and the first light brightness as the light color and the light brightness of the illumination mode of the intelligent flashlight, when the route determination result indicates that the current route information is consistent with the reference route information; and acquiring a pre-stored eighth light color and a pre-stored second light brightness associated with a deviation direction of the current route information from the reference route information and setting the eighth light color and the second light brightness as the light color and the light brightness of the illumination mode of the intelligent flashlight, when the route determination result indicates that the current route information is not consistent with the reference route information.

6. The method according to claim 1, wherein acquiring the current route information of the intelligent flashlight comprises:

acquiring, through a positioning function of the intelligent flashlight, the current route information while the user of the intelligent flashlight is travelling; or acquiring, from the terminal associated with the intelligent flashlight, the current route information while the user of the intelligent flashlight is travelling.

7. The method according to claim 1, further comprising: determining whether the intelligent flashlight is in a setting mode that allows to determine the illumination mode of the intelligent flashlight according to the route determination result, and wherein determining whether the intelligent flashlight is in a setting mode comprises:

detecting a selection operation of the user of the intelligent flashlight to activate or deactivate the setting mode of the intelligent flashlight; and activating or deactivating the setting mode according to the detected selection operation of the user.

8. The method according to claim 1, further comprising: determining whether the intelligent flashlight is in a setting mode that allows to determine the illumination mode of the intelligent flashlight according to the route determination result, and wherein determining whether the intelligent flashlight is in a setting mode comprises:

determining a current time;

determining whether the current time falls within a pre-set time range; and activating or deactivating the setting mode according to the determination result of whether the current time falls within the pre-set time range.

9. A computer readable storage medium having stored thereon a computer program that, when being executed by a processor, performs steps of the method according to claim 1.

10. The storage medium according to claim 9, wherein when being executed by the processor, the computer program further perform steps of the method according to claim 2.

11. The storage medium according to claim 9, wherein when being executed by the processor, the computer program further perform steps of the method according to claim 3.

12. The storage medium according to claim 9, wherein when being executed by the processor, the computer program further perform steps of the method according to claim 4.

13. An intelligent device, comprising:

a processor; and a memory for storing instructions executable by the processor;

wherein the processor is configured to:

acquire reference route information, via an acquiring module, for current navigation from a terminal-communicably connected with the intelligent flashlight, wherein the reference route information is a reference route for navigation generated by the terminal;

acquire current route information of the intelligent flashlight via a judging module, wherein the current route information is a route that a user is travelling in real time which is acquired by the intelligent flashlight based on its positioning function or from the terminal;

determine, via the judging module, whether the current route information is consistent with the reference route information, and generate a route determination result; and determine an illumination mode of the intelligent flashlight, via a determining module, according to the route determination result, wherein the illumination mode comprises a lighting parameter of the intelligent flashlight.

14. The intelligent device according to claim 13, wherein the illumination mode comprises a light color of light emitted from the intelligent flashlight, and determining an illumination mode of the intelligent flashlight according to the route determination result comprises:

acquire a pre-stored first light color and setting the first light color as the light color of the illumination mode of the intelligent flashlight, when the route determination result indicates that the current route information is consistent with the reference route information; and acquire a pre-stored second light color and setting the second light color as the light color of the illumination mode of the intelligent flashlight, when the route determination result indicates that the current route information is not consistent with the reference route information.

15. The intelligent device according to claim 13, wherein the illumination mode comprises a light color of light emitted from the intelligent flashlight, and wherein determining an illumination mode of the intelligent flashlight according to the route determination result comprises:
   acquire a pre-stored third light color associated with a navigation direction of the current route information and set the third light color as the light color of the illumination mode of the intelligent flashlight, when the route determination result indicates that the current route information is consistent with the reference route information; and
   acquire a pre-stored fourth light color associated with a deviation of the current route information from the reference route information and set the fourth light color as the light color of the illumination mode of the intelligent flashlight, when the route determination result indicates that the current route information is not consistent with the reference route information.

16. The intelligent device according to claim 13, wherein the illumination mode comprises a light color and a light flashing frequency of light emitted from the intelligent flashlight, and wherein determining an illumination mode of the intelligent flashlight according to the route determination result comprises:
   acquiring a pre-stored fifth light color and a pre-stored first light flashing frequency associated with a navigation direction of the current route information and setting the fifth light color and the first light flashing frequency as the light color and the light flashing frequency of the illumination mode of the intelligent flashlight, when the route determination result indicates that the current route information is consistent with the reference route information;
   acquiring a pre-stored sixth light color and a pre-stored second light flashing frequency associated with a deviation of the current route information from the reference route information and setting the sixth light color and the second light flashing frequency as the light color and the light flashing frequency of the illumination mode of the intelligent flashlight, when the route determination result indicates that the current route information is not consistent with the reference route information.

17. The intelligent device according to claim 13, wherein the illumination mode comprises a light color and a light brightness of light emitted from the intelligent flashlight, and wherein determining an illumination mode of the intelligent flashlight according to the route determination result comprises:
   acquiring a pre-stored seventh light color and a pre-stored first light brightness associated with a navigation direction of the current route information and setting the seventh light color and the first light brightness as the light color and the light brightness of the illumination mode of the intelligent flashlight, when the route determination result indicates that the current route information is consistent with the reference route information; and
   acquiring a pre-stored eighth light color and a pre-stored second light brightness associated with a deviation direction of the current route information from the reference route information and setting the eighth light color and the second light brightness as the light color and the light brightness of the illumination mode of the intelligent flashlight, when the route determination result indicates that the current route information is not consistent with the reference route information.

18. The intelligent device according to claim 13, wherein the processor is further configured such that acquiring the current route information of the intelligent flashlight comprises:
   acquiring, through a positioning function of the intelligent flashlight, the current route information while the user of the intelligent flashlight is travelling; or
   acquiring, from the terminal associated with the intelligent flashlight, the current route information while the user of the intelligent flashlight is travelling.

19. The intelligent device according to claim 13, wherein the processor is further configured to determine whether the intelligent flashlight is in a setting mode that allows to determine the illumination mode of the intelligent flashlight according to the route determination result, and
   wherein determining whether the intelligent flashlight is in a setting mode comprises:
   detecting a selection operation of the user of the intelligent flashlight to activate or deactivate the setting mode of the intelligent flashlight; and
   activating or deactivating the setting mode according to the detected selection operation of the user.

20. The intelligent device according to claim 13, wherein the processor is further configured to determine whether the intelligent flashlight is in a setting mode that allows to determine the illumination mode of the intelligent flashlight according to the route determination result, and
   wherein determining whether the intelligent flashlight is in a setting mode comprises:
   determining a current time;
   determining whether the current time falls within a pre-set time range; and
   activating or deactivating the setting mode according to the determination result of whether the current time falls within the pre-set time range.

* * * * *